Oct. 19, 1948.    C. D. KNOWLTON ET AL    2,451,561
CONTINUOUS BRUSHING MACHINE FOR LEATHER
Filed Aug. 22, 1946    3 Sheets-Sheet 2

Inventors
Cutler D. Knowlton
David Edgar
By their Attorney

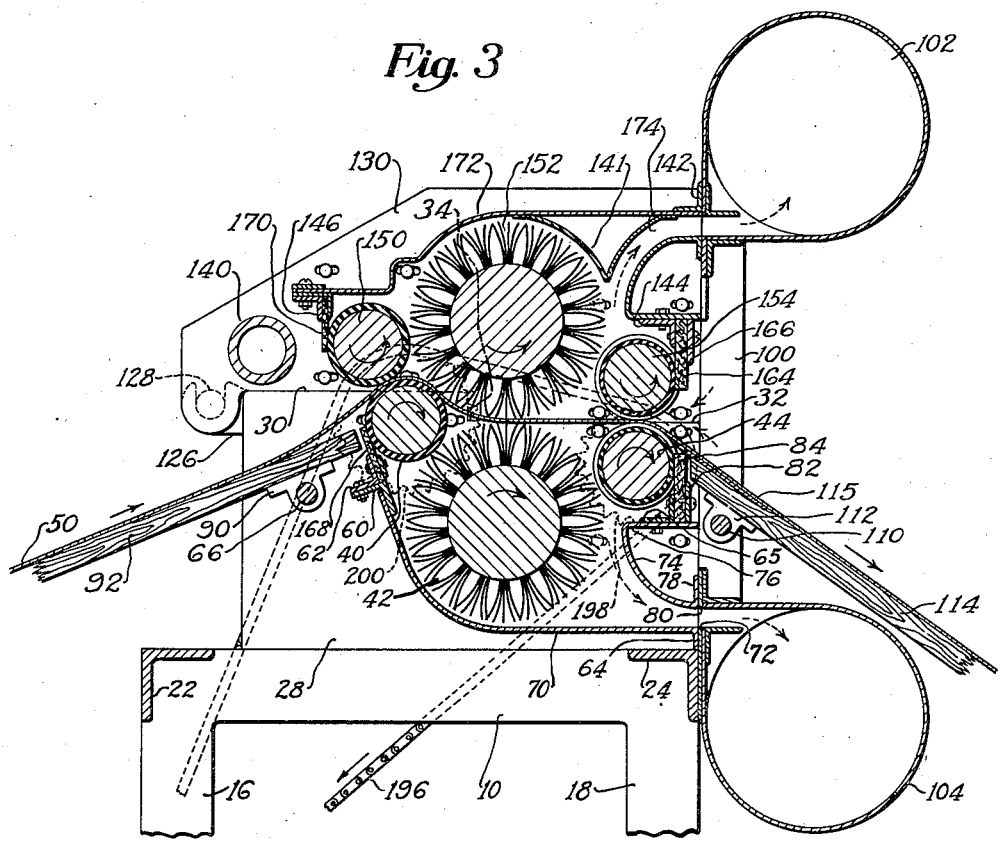
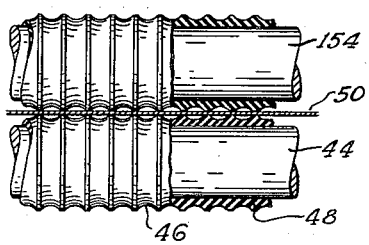
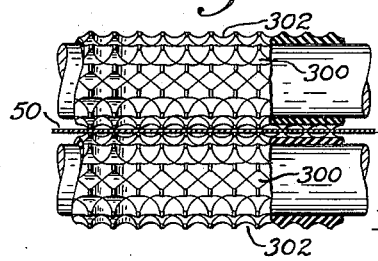
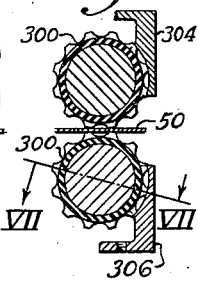
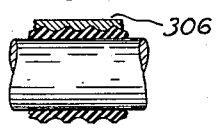
Inventors
Cutler D. Knowlton
David Edgar
By their Attorney Patented Oct. 19, 1948

2,451,561

UNITED STATES PATENT OFFICE 2,451,561

CONTINUOUS BRUSHING MACHINE FOR LEATHER

Cutler D. Knowlton, Rockport, and David Edgar, Lynn, Mass., assignors to United Shoe Machinery Corporation, Flemington, N. J., a corporation of New Jersey Application August 22, 1946, Serial No. 692,218

12 Claims. (Cl. 69—37)

This invention relates to machines for brushing hides and skins to remove dust particles therefrom.

Machines for brushing tanned calf skins and kid skins have heretofore been constructed to treat only about half of a given work piece at a time. In the use of such machines, the handling of each work piece is extensive, due to the necessary reversal and reintroduction of the work piece into the machine in order that the whole of the work piece will be properly treated. Such handling has heretofore been regarded as necessary particularly in operating upon light leathers due to the great difficulty in feeding such leathers into and through the brushing instrumentalities of the machines. Moreover, the prevalence of static charges on the surfaces of the brushed work piece and/or in the dust particles adds to the difficulties since dust brushed from a work piece has a tendency to return to the work piece sometimes necessitating further treatment requiring additional handling of the work. Various expedients have been tried with varying success to prevent such return of the dust.

It is an object of this invention to provide a machine of minimum complexity which will perform the brushing operation upon a hide or skin in one passage through the machine and in which air currents are passed through the machine only at the points most effective for efficient removal of the dust as it is brushed off the work piece. It is also an object to provide a machine in which the effective contact between the brushing means and the work piece is increased and thereby secure a high degree of dust removal. Another object is to provide an improved machine for brushing leather which is easily accessible for servicing, repair or replacement of parts.

It is an important feature of the invention that a work piece discharge roll is provided on a brushing machine, which roll is provided with surface passages as an effective means permitting air to enter the machine and remove dust displaced from the work, such air entering directly into the space where the dust is brushed from the hide or skin being treated.

Still another feature is a special discharge roll having surface passages for the passage of air and also longitudinal grooves to insure proper discharge of the work piece.

A further feature is the arrangement of a brush roll with relation to the other elements of the machine, this arrangement being such that a work piece being fed through the machine is caused to be wrapped around the brush roll for a substantial arcuate distance thereby rendering a more effective brushing action.

Another feature is the provision of a removable upper portion of the machine casing in which a number of the rolls are journaled, the upper portion being easily removed for convenient access to the working parts.

In the illustrated construction, a pair of brush rolls is enclosed by a casing formed in part by two feed rolls and two discharge rolls in such a way that passage of air may be effected by a fan through the enclosure, the air entering by way of surface passages on the discharge rolls. Conveniently, these passages may be annular grooves in the rolls and it is preferred that such rolls be also provided with longitudinal grooves insuring proper work piece discharge despite entrance of air through the annular grooves.

In the preferred construction, the bite of the brush rolls is located at a position offset from the line of travel a work piece would follow if it were to go directly from the feeding means to the discharging means—i. e.—the line of entry and/or discharge of the work piece is offset from the plane of action at the bite of the brush rolls. In the specific arrangement of the parts herein disclosed, greater contact and more effective action of the brush roll on the top side (usually the grain side) of the leather being treated is achieved and less contact and less brushing is given to the lower or flesh side of the leather by the other brush roll. If desired, the rolls may be so arranged as to give a partial "wrap around" of both brush rolls for more effective brushing of both sides of a work piece.

There are various ways by means of which a work piece may be brought into more efficient and effective contact with one brush roll or with two brush rolls. Work piece deflecting means, such as bars or supplementary rollers, may be incorporated in the machine for the purpose. If desired, the design of the machine may be such that the plane of the axes of the brush rolls is inclined slightly from a position normal to the line of travel of a work piece passing through the machine. Such an inclination or resulting relation of the machine parts would cause a treated work piece to be subjected to more extensive contact with both brush rolls. In the preferred construction, the axes of the brush rolls are arranged in the same vertical plane and the other rolls are so placed as to result in the work piece being more extensively brushed on one side as compared with the other.

As shown, the casing which encloses the major portion of the moving elements of the machine is made with an upper part or housing removable for easy access to facilitate repair, replacement, maintenance, etc. A number of the power driven rolls (half of them in the particular embodiment of the invention shown) are journaled in the upper half of the casing which together with the rolls supported thereby may be conveniently moved into an out-of-the-way position.

The above and other features of the invention, including various novel details of construction and combinations of parts will now be more particularly described by reference to the accompanying drawings and pointed out in the claims.

In the drawings,

Fig. 3 is a sectional view taken on line III—III of Fig. 1, but drawn on an enlarged scale;

Fig. 4 is a view partly in elevation and partly in section on an enlarged scale of the discharge rolls shown in Fig. 1;

Fig. 5 is a view similar to that of Fig. 4 but showing a modified construction;

Fig. 6 is a sectional view through the discharge rolls shown in Fig. 5; and

Fig. 7 is a section on the line VII—VII of Fig. 6.

Figure 1:
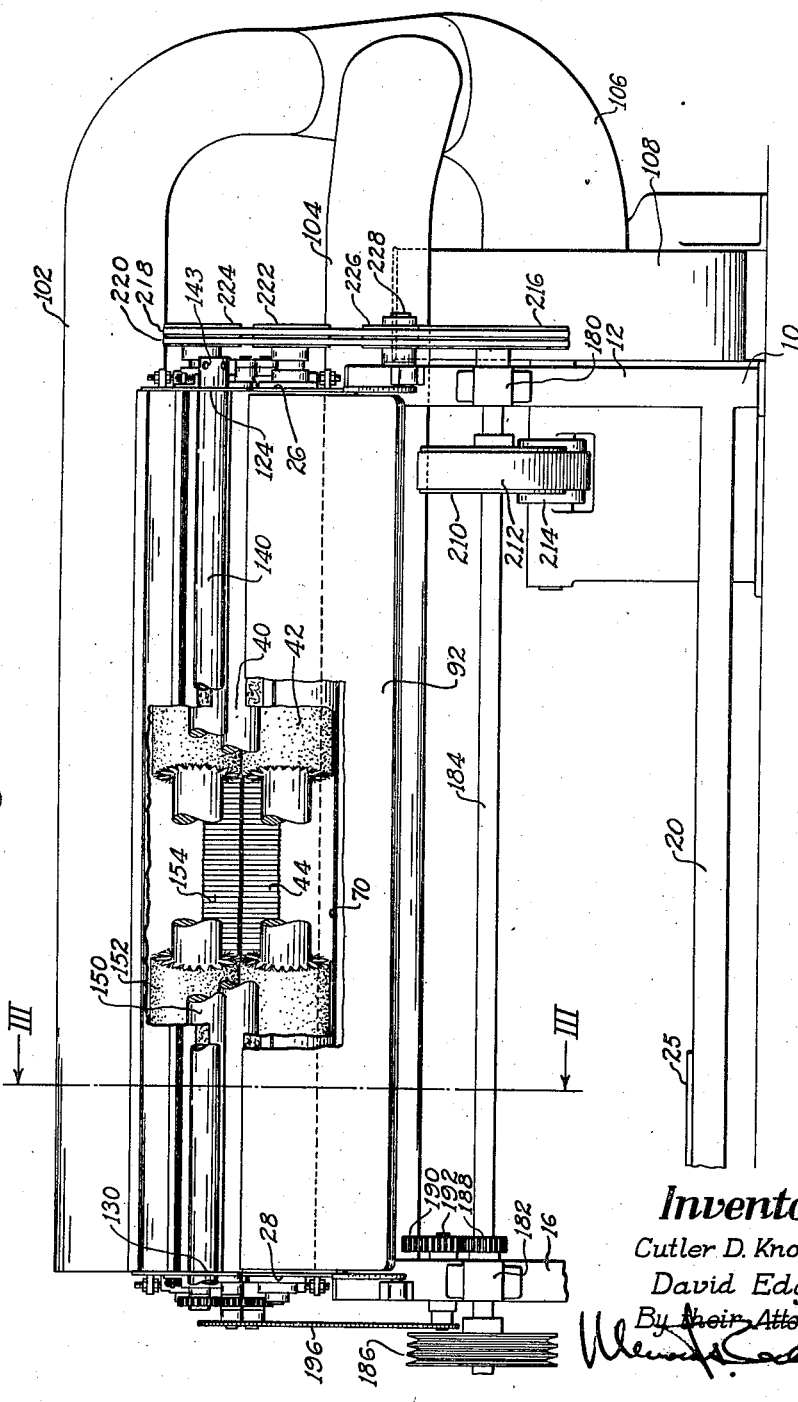
Fig. 1 is a front view of a brushing machine in which the present invention is embodied, some of the parts broken away for ease of illustration.
Figure 2:
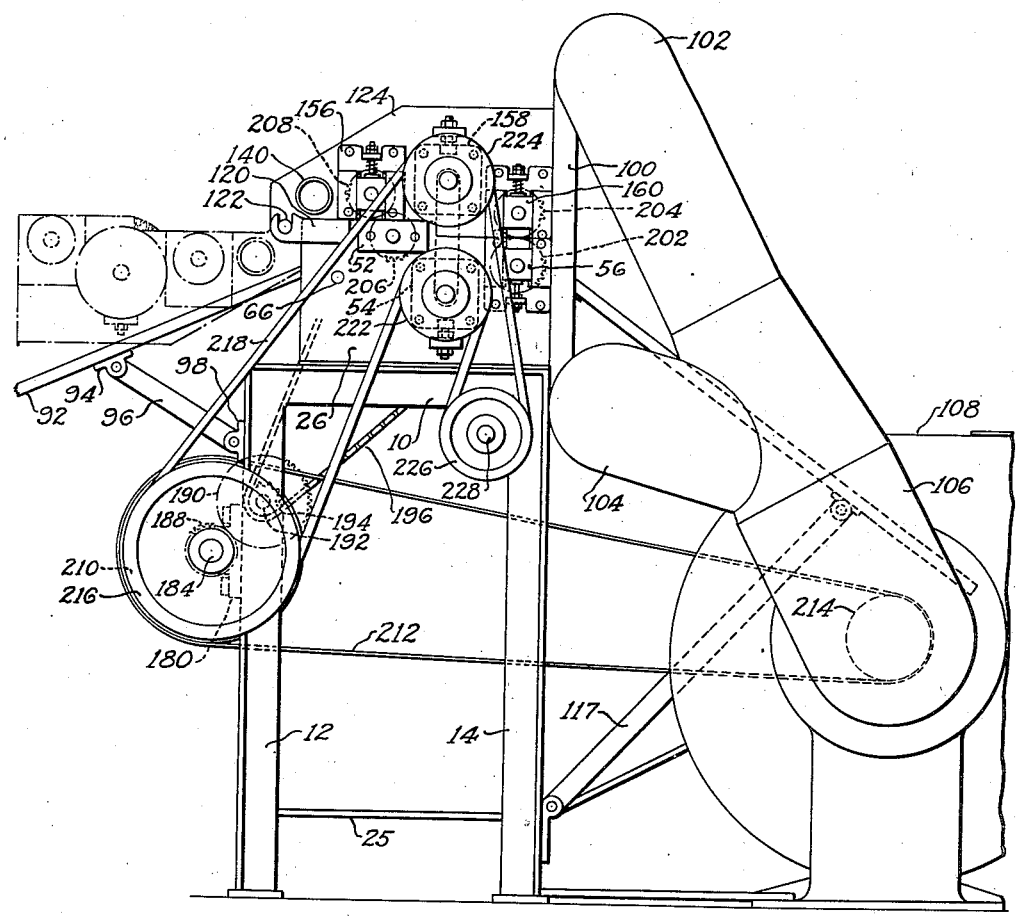
Fig. 2 is a view in elevation of the right end of the machine shown in Fig. 1, and illustrating the accessibility of the parts.

The machine utilizes a main frame 10 having four vertical stanchions 12, 14, 16 and 18 and horizontal stiffening members 20 (Fig. 1), 22 and 24 (Fig. 3) as well as a shelf 25 (Fig. 2). Over this main frame 10 are mounted two plate-like main bearing blocks 26 and 28. As seen in Fig. 3, the main bearing block 28 is supported on the top of the main frame 10 and has two horizontal top surfaces 30 and 32, these two horizontal surfaces terminating at a substantially vertical shoulder 34 approximately midway the length of the block 28.

The main bearing block 26 (Fig. 2) is similar to bearing block 28 and the two blocks cooperate to support rotatively three power driven rolls 40, 42 and 44 (Figs. 1 and 3). The roll 40 serves as a feeding roll and is preferably covered with some yielding material such as rubber or fabric.

The roll 42, which constitutes a work treating or brush roll, is mounted so that there is a slight amount of clearance between its peripheral surface and the surface of the feeding roll 40.

The roll 44 which preferably and as illustrated is rubber covered has annular grooves or channels 46 as shown in Fig. 4. The roll is so mounted that the ridges between the grooves 46 just clear the bristles or outer periphery of the brush roll 42. The roll 44 is grooved throughout its full length, the grooves or channels being formed in a rubber covering 48.

As may be seen in Fig. 3, the relative locations of the axes of rolls 40, 42 and 44 are such that a work piece 50 passed in contact with the tops thereof is constrained to follow an ogee path while passing through the machine. The individual bearing blocks (Fig. 2) 52, 54, 56 of the rolls 40, 42 and 44 are resiliently and adjustably mounted upon the main bearing blocks 26 and 28 in a conventional manner and thereby cause the rolls to contact the work with sufficient force or pressure for performing their functions. Only one set of the individual bearing blocks 52, 54 and 56 (the one on bearing block 26) is shown but it is to be understood that the set on bearing block 28 is similar. The individual bearing blocks are not described in detail as they form no part of the present invention and are conventional.

The bearing blocks 26 and 28 are rigidly connected together by an angle bar 60 and rod 66 (Figs. 2 and 3) welded or otherwise fastened thereto. An angle bar 62 (Fig. 3) is adjustably mounted by means of bolts on the angle bar 60 for sealing purposes as will be described. A lower exhaust housing is provided and is composed of the two bearing blocks 26 and 28 and a lower curved metal sheet 70 the upper end of which is fastened to the depending flange of the angle bar 60 and the other end being flanged at 64 (Fig. 3) for attachment to a stiffening plate 72 extending across the back of the machine frame 10. The upper and rear side of the lower exhaust housing is composed of an arcuate plate 74 joining the main bearing blocks 26 and 28 and this plate has a horizontal stiffening flange 76 and also a vertical flange 78 attached to a stiffening plate 80 at the rear of the machine. The arcuate plate 74 and the metal sheet 70 cooperate to form a duct or slot extending across the machine to serve as an air exhaust conduit. The vertical flange of an angle bar 65, together with a vertical confining plate 82, serves as a means for supporting a wooden or matted fabric strip 84 which is so shaped as closely to engage the annular ridges and valleys formed in the rubber coating 48 of the discharge roll 44 and serve as a seal. The angle bar 65 and plate 82 may be adjusted on top of the flange 76 to secure the proper seal of the strip 84 with the discharge roll.

The rod 66 bears a number of brackets 90, only one being shown in Fig. 3, and these brackets serve to support the upper end of a work table 92 over which work may be presented to the treating rolls of the machine. Other brackets 94 (Fig. 2) are placed on the under side of the work table 92 and to which links 96 are connected, these links being supported at their lower ends by brackets 98 attached to the vertical stanchions 12 and 16.

At the back of the machine a vertical framework 100 is permanently installed by connecting angle bars thereof to the stiffening plates 72 and 80 supported by the main bearing blocks 26 and 28. This framework 100 supports two horizontal exhaust conduits 102 and 104 which extend across the back of the machine and are closed at the left-hand end of the machine (Fig. 1). These two conduits are joined at the right-hand side of the machine to a common duct 106 connected to the inlet of an exhaust fan or blower 108 mounted on the floor to the rear of the machine.

The framework 100 also supports a horizontal bar 110 (Fig. 3) which in turn passes through brackets 112, one of which is shown in Fig. 3, attached to the under side of a discharge table 114. This table 114 is inclined downwardly and rearwardly and is positioned to receive work as it emerges from the rear of the machine and from over the top of the discharge roll 44. A thin metal plate 115 (Fig. 3) aids in smoothly conveying the leather to the table 114. The lower end of the table 114 is suitably supported by inclined links 117, one of which is shown in Fig. 2.

Secured to the main bearing block 26 (Fig. 2) adjacent its upper end is a bracket 120 which extends forwardly of the block 26 and has formed in its forwardly extending portion a vertical slot open at its upper end to receive a horizontal pin 122 carried by and extending from an upper bearing block 124. The main bearing block 28 is provided with a bracket 126 which is similar to the bracket 120 and is arranged to receive and support a pin 128 (Fig. 3) projecting from a second upper bearing block 130 in axial alinement with the pin 122. The bottom edge surfaces of the bearing blocks 124 and 130 are so shaped as to conform to the shape of the upper edge surfaces of the main bearing blocks 26 and 28. The shoulder 34 and its companion shoulder at the other end of the machine may be inclined slightly with respect to the vertical. These upper bearing blocks 124 and 130 are rigidly connected together by a horizontal tube 140, a portion 141 of an upper housing enclosing the top of the machine, and by an angle bar 142. Horizontal angle bars 144 and 146 are adjustably mounted by means of bolts with relation to the upper housing. Rotatably mounted within the upper bearing blocks 124 and 130 are rolls 150, 152 and 154 and these are provided with two sets of adjustable and individual bearings 156, 158 and 160 (the set of bearings in block 124 only being shown).

The bar 140 may extend beyond the bearing blocks 124 and 130 and it is so shown in the drawings. This bar not only serves as a structural member for strength but is may be provided with radial holes 143 (Fig. 1) at one or both ends into which a bar may be inserted to swing the rolls 150, 152, 154 and their housing about the axis of the pins 122, 128 into an out-of-the-way position to facilitate repair of the machine. The forward edge face of the upper bearing blocks 124, 130 acts by engagement with the forward edge faces of the lower bearing block 26, 28 to limit swinging movement of the upper blocks about the axis of the pins 122 and 128 and to hold the parts in their out-of-the-way position during repair as indicated by the dot-and-dash lines in Fig. 2.

The roll 150 is preferably rubber or fabric covered and is mounted to cooperate with the roll 40 in feeding a work piece into the machine. As seen in Fig. 3, the feed rolls 40 and 150 are so mounted that the work piece 50 will come into intimate contact with the means for treating it.

The roll 154 serves as a discharge roll and is mounted that its peripheral surface just clears the surface of the roll 150. The roll 152 acts to brush a work piece 50 as the latter is made taut by the combined action of all the rolls, the axes of which are so arranged that the roll 152 acts on the upper surface of the work piece 50 for an appreciable arcuate distance, i. e., from a point of tangency with the leather surface between the roll 40 and the brush roll 152 to the bite of the brush rolls 42 and 152.

The roll 153 serves as a discharge roll and is similar to roll 44 in that it is mounted to clear its corresponding brush roll and engages the work piece being treated. It is likewise mounted for sliding and sealing contact with a wooden or matted fabric sheet or plate 164 confined between the vertical flange of the angle bar 144 and a supporting plate 166.

Wipers 168 and 170 are provided at the front of the machine to form seals with the feed rolls 40 and 150 respectively, thereby preventing air from entering at those points.

The portion 141 (Fig. 3) acts as a stiffener for the upper housing 172, which housing is of sheet metal and extends between the two upper bearing blocks 124 and 130 and closely follows the contour of the upper brush roll 152 and a passage or slot 174 is provided by the sheet metal work to act as a conduit to the upper discharge duct 102. The slot 174 is so proportioned as to give a fairly uniform discharge flow of air from the zone immediately behind and longitudinal of the brush roll 152.

Extending across the front of the machine and mounted in bearings 180, 182 (Fig. 1) is a horizontal drive shaft 184 to the left-hand end of which is keyed a multiple belt pulley 186 which may be driven by means of a belt (not shown) from any convenient source of power. Also keyed to the shaft 184 is a gear 188 which is in mesh with a larger gear 190 which is keyed to a short shaft 192 (Figs. 1 and 2) journaled within the stanchion 16. At the other end of the short shaft 192 is keyed a sprocket 194 (Fig. 2) for driving a chain 196 which runs over two larger sprockets 198 and 200 (Fig. 3). The sprocket 198 is attached to the shaft of the lower discharge roll 44 and the sprocket 200 is attached to the shaft of the lower feed roll 40. Gear 198 is made with a diameter slightly less than that of gear 200 as the discharge rolls should preferably rotate at a slightly greater rate than do the feed rolls. This is for the purpose of maintaining the work taut while being brushed. The R. P. M. of the discharge rolls for certain classes of work may be as much as 10 to 20% greater than the R. P. M. of the feed rolls. The shaft of the lower discharge roll 44 is geared to the shaft of the upper discharge roll 154 by gears 202 and 204. The shafts of the lower feed roll 40 and the upper feed roll 150 are geared together by gears 206 and 208. The teeth of the gears 202, 204, 206 and 208 are of such length that they will not disengage despite the adjustment and essential slight movements of the corresponding rolls.

Also geared to the long horizontal shaft 184 is a pulley 210 which drives a belt 212 which in its turn passes over a pulley 214 for driving the fan of the blower 108.

At the right-hand end of the long shaft 184 is keyed a twin belt pulley 216 over which are passed twin belts 218 and 220 which belts serve to drive the brush rolls 42 and 152 by means of pulleys 222 and 224 respectively. An idle pulley 226 is mounted on a shaft 228 protruding from the right end of the machine frame 10 and this pulley is made adjustable (by means not shown) for regulating the tension in the two belts 218 and 220.

It will be noted that the discharge rolls of Fig. 4 are rubber covered and annularly grooved as described above and that the spaces between the work piece 50 and the bottoms of the grooves 46 are such as to permit air to enter directly into the spaces in which dust is dislodged by the brushes. The result is that the inrushing air will prevent the dislodged dust from returning to the surface of the work piece being treated and will carry the dust into the discharge ducts 102 and 104.

In Fig. 5 the discharge rolls have been modified by providing longitudinal grooves 300 as well as annular grooves 302. With such a construction the discharge rolls secure a firmer grip of the work piece and any possibility of the work piece with its irregular contour passing around either of the discharge rolls instead of passing through the bite between the rolls is rendered highly improbable. Although not deemed essential, the longitudinal grooves 300 are designed to make the discharge more positive. As seen in Figs. 6 and 7, the sealing means may comprise flanged members 304 and 306 made of wood or metal and bearing grooves to conform with the annular grooves of the corresponding discharge roll. The grooves in the sealing members 304 and 306 are of such arcuate length that at least one ridge between the longitudinal grooves 300 will form a seal at all times.

In operating the machine a work piece 50 is passed across and upwardly over the inclined table 92 and is grasped by the cooperating feed rolls 40 and 150 and fed into contact with the rotating brush roll 152. As the direction of rotation of all the rolls is as shown by the arrows in Fig. 3, the work piece is then constrained to follow an ogee path and the upper surface (usually the grain side) of the leather work piece is contacted over a considerable area by the bristles of the upper brush roll 152 after which the leading edge of the work piece contacts either or both of the discharge rolls 44 and 154. As the work piece is discharged between the two discharge rolls air will enter through the annular grooves 46 or 302 next to the work piece and aid in suspending the dislodged dust away from the surfaces of the work piece. The exhaust fan or blower 108 constantly removes the air from the zones between the brush rolls and the discharge rolls and, as substantially the only inlet for air into the machine is through the annular channels 46 or 302, the dust is promptly removed after being dislodged by the brushes and the work piece is thoroughly cleaned after which it emerges and slides down the inclined table 114.

Having described our invention, what we claim as new and desire to secure by Letters Patent of the United States is:

1. In a machine for removing dust from hides and skins, a pair of brush rolls between which a work piece may be passed and treated on both grooved discharge rolls for passing the work piece to the bite of the brush rolls, a pair of grooved discharged rolls for passing the work piece away from the brush rolls, a casing forming with the said feed rolls and discharge rolls an enclosure for the brush rolls, and suction means connected to said casing.

2. In a machine for removing dust from hides and skins, a brush roll, a casing forming with a work piece support, a feed roll and a discharge roll an enclosure for the said brush roll, the surface of the discharge roll being grooved longitudinally as well as arcuately, and means for passing air through the casing partly by way of the arcuate grooves.

3. In a machine for removing dust from hides and skins, a pair of brush rolls, a casing forming with two feed rolls and two discharge rolls an enclosure for the said pair of brush rolls, the discharge rolls being grooved longitudinally and having surface passages, and means for passing air through the casing partly by way of the surface passages.

4. In a machine for removing dust from hides and skins, a pair of brush rolls the axes of which are approximately in the same vertical plane, a casing forming with two feed rolls and two grooved discharge rolls an enclosure for the said pair of brush rolls, the said rolls including one feed roll, one brush roll and one discharge roll journaled in an upper portion of the said casing, the said upper portion of the casing being removable, and means for passing air through the casing partly by way of the grooves in the discharge roll.

5. In a machine for removing dust from hides and skins, a pair of brush rolls, a casing forming with two feed rolls and two discharge rolls an enclosure for the said pair of brush rolls, the discharge rolls having longitudinal and annular grooves, the said rolls including one feed roll, one discharge roll and one brush roll journaled in an upper portion of the casing, and means for passing air by suction through the annular grooves of the discharge rolls through and by the bristles of the brush rolls and out from the said casing.

6. In a machine for removing dust from hides and skins, a pair of brush rolls mounted to treat a work piece between them, a casing enclosing the said brush rolls and provided with approximately air-tight means for feeding said work piece to the brush rolls, discharge rolls having surface passages for the admission of air to said casing at the bite of said discharge rolls, and the casing wall contacting said discharge rolls to form seals.

7. In a machine for removing dust from hides and skins, a pair of brush rolls, a casing forming with two feed rolls and two discharge rolls an enclosure for the said pair of brush rolls, the bite of the two feed rolls being offset from the plane of action of the brush rolls and the discharge rolls, and means for passing air through surface passages of the discharge rolls into the said casing and then out from the casing carrying dust displaced from a work piece passed between the said brush rolls.

8. In a machine for removing dust from hides and skins, a pair of brush rolls the axes of which are aproximately in the same vertical plane, a casing enclosing the said brush rolls, said casing including two feed rolls for feeding a work piece to said brush rolls and annularly grooved discharge rolls for removing said work piece from the brush rolls, said discharge rolls arranged to admit air to the casing only through their annular grooves, the bite of the two feed rolls being offset from the plane of action of the brush rolls and the discharge rolls, power means for driving said rolls at different rates to cause the work piece to be kept taut while being brushed, and suction means connected to said casing.

9. In a machine for removing dust from hides and skins, a pair of brush rolls the axes of which are approximately in the same vertical plane, a casing enclosing the said brush rolls, said casing including feed rolls for feeding a work piece to said brush rolls and discharge means with air inlet passages, the bite of said feed rolls being offset from the plane of action of the brush rolls and the discharging means, the upper portion of the said casing together with some of the rolls being removable as a unit, power means for driving all the said rolls and the discharge means at such different rates as to cause the work piece to be kept taut while being brushed and while partly encircling one of the brush rolls, and suction means connected to said casing.

10. In a machine for removing dust from hides and skins, a casing having suction means connected thereto, a pair of power driven brush rolls arranged for the brushing of a work piece passed between them, a pair of cooperating discharge rolls having annular channels, and means for sealing the casing against entering air except through the said channels at the bite of the discharge rolls.

11. In a machine for removing dust from hides and skins, a casing having suction means connected thereto, a power driven brush roll, means for constraining a work piece against the brush roll, work discharge means comprising a discharge roll having annular channels, and means for sealing the casing against entering air except through said channels adjacent the area of contact between the discharge roll and the work piece.

12. In a machine as set forth in claim 11, the said discharge roll having both annular and longitudinal channels.

CUTLER D. KNOWLTON.
DAVID EDGAR.

REFERENCES CITED

The following references are of record in the file of this patent:

UNITED STATES PATENTS

| Number | Name | Date |
|---|---|---|
| 99,073 | Drew | Jan. 25, 1870 |
| 407,309 | Warsop et al. | July 16, 1889 |
| 841,309 | Buschman | Jan. 15, 1907 |
| 2,358,334 | Knowlton | Sept. 19, 1944 |

Certificate of Correction

Patent No. 2,451,561.  October 19, 1948.

CUTLER D. KNOWLTON ET AL.

It is hereby certified that errors appear in the printed specification of the above numbered patent requiring correction as follows:

Column 5, line 51, strike out "154 serves as a discharge roll and is" and insert instead *152, which is a brush roll, is so*; line 62, for "roll 153" read *roll 154*; column 7, line 44, claim 1, for "grooved discharge" read *sides, a pair of feed*;

and that the said Letters Patent should be read with these corrections therein that the same may conform to the record of the case in the Patent Office.

Signed and sealed this 5th day of April, A. D. 1949.

[SEAL]

THOMAS F. MURPHY,
*Assistant Commissioner of Patents.*